Oct. 12, 1937.　　　　R. A. GOEPFRICH　　　　2,095,808
BRAKE
Filed Feb. 3, 1937　　　　2 Sheets-Sheet 1

INVENTOR
RUDOLPH A. GOEPFRICH
BY
M. W. McConkey
ATTORNEY

Oct. 12, 1937.   R. A. GOEPFRICH   2,095,808
BRAKE
Filed Feb. 3, 1937    2 Sheets—Sheet 2

INVENTOR
RUDOLPH A. GOEPFRICH
BY
D. W. McConkey
ATTORNEY

Patented Oct. 12, 1937

2,095,808

UNITED STATES PATENT OFFICE 2,095,808

BRAKE

Rudolph A. Goepfrich, South Bend, Ind., assignor to Bendix Products Corporation, South Bend., Ind., a corporation of Indiana Application February 3, 1937, Serial No. 123,797

3 Claims. (Cl. 188—106)

This invention relates to brakes, and is illustrated as embodied in an internal expanding brake for an automobile wheel. An object of the invention is to provide compact means for operating the brake both for service and emergency, preferably hydraulically for service and mechanically for emergency.

In one desirable arrangement there are two wedges, acting on rollers carried by the shoe ends and movable in opposite directions perpendicular to the plane of the brake. The wedge which moves toward the brake backing plate in applying the brake is connected to a tension element passing through the backing plate, and which may be the cable of a Bowden-type control. The other wedge is operated by a thrust member passing through the backing plate, and which is illustrated as passing into the open end of a cup-shaped wheel cylinder mounted on the exterior of the backing plate, and operatively engaged by a piston in the cylinder.

The above and other objects and features of the invention, including various novel combinations of parts and desirable particular constructions, will be apparent from the following description of the illustrative embodiment shown in the accompanying drawings, in which.

Figure 1:
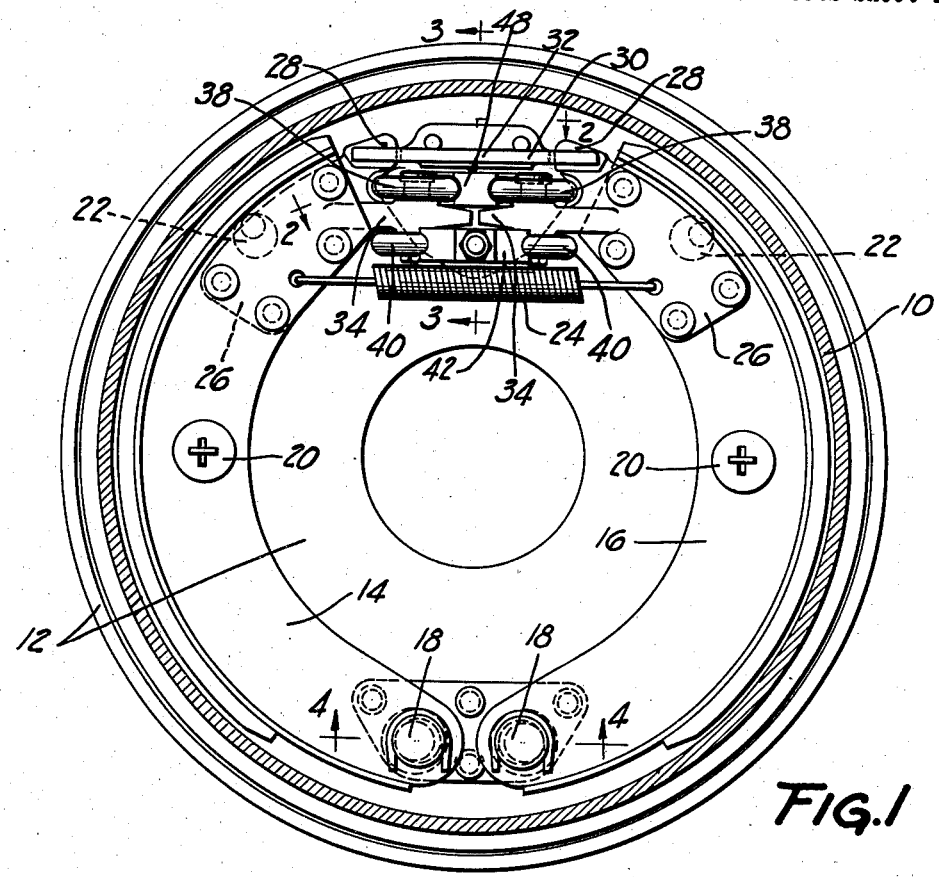
Figure 1 is a vertical section through the brake, just inside the head of the brake drum, and showing the brake shoes in side elevation.
Figure 2:
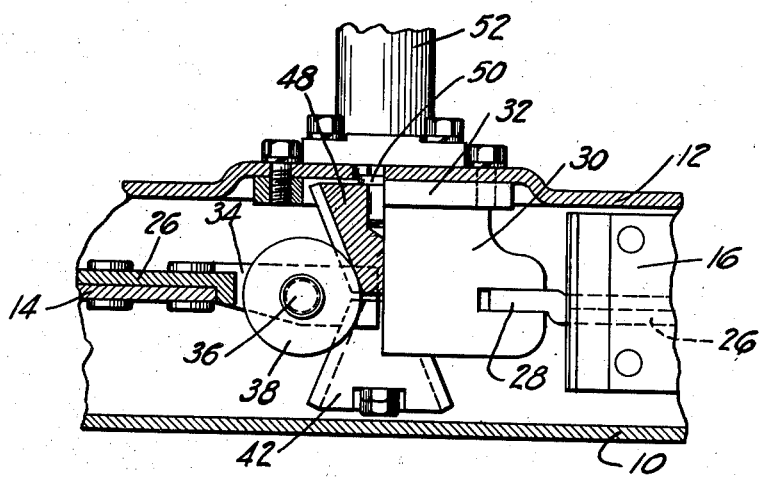
Figure 2 is a partial section through the applying means of the brake, on the line 2—2 of Figure 1.
Figure 3:
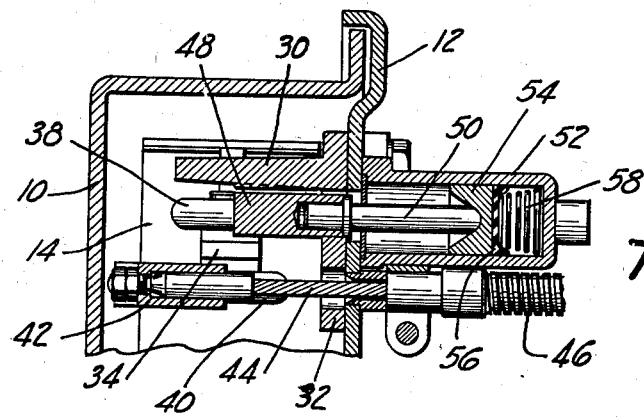
Figure 3 is a partial radial section through the applying means, on the line 3—3 of Figure 1.

The illustrated brake includes a rotatable drum 10, at the open side of which is a support such as a backing plate 12, and within which is the friction means of the brake. The friction means is shown as including a pair of shoes 14 and 16 mounted on anchors such as adjustable eccentric pivots 18 carried by the backing plate. The shoes may be provided with suitable spring steady rests 20 and adjustable stops 22 against which they are held by a return spring 24 when the brake is released.

The unanchored ends of the shoes are provided with suitable fittings, such as forgings 26 riveted thereto, having parts 28 guidingly slidably embraced in slots formed in a flange 30 on a bracket 32 secured to the backing plate. The forgings 26 also have tongues 34 carrying generally-radial pivots 36, each having inner and outer rolls 38 and 40 mounted on its ends.

The inner rolls 40 of the two shoes engage the grooved sides of a wedge 42, movable perpendicularly toward the backing plate to apply the brake, and connected operatively to a tension element such as the cable 44 of a Bowden control. The cable 44 passes through the backing plate into the flexible conduit 46 of the control.

The outer rollers 38 embrace the grooved sides of a second wedge 48, which moves away from the backing plate in applying the brake, and which is actuated by a thrust element 50 passing through the backing plate. The thrust member 50 passes into the open end of a cup-shaped wheel cylinder 52, bolted or otherwise secured to the backing plate, and is there engaged by a piston 54 in the cylinder. The piston is shown with a rubber packing cup 56 held in place by a spring 58.

Figures 4, 6:
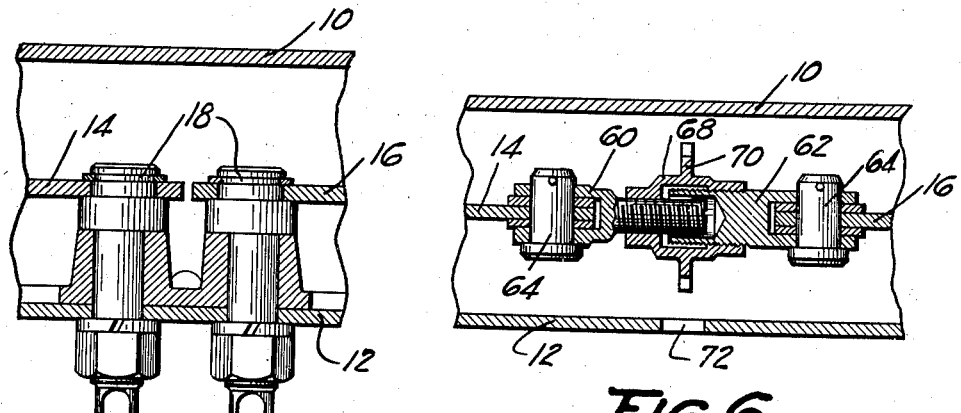
Figure 4 is a partial section through the brake anchors, on the line 4—4 of Figure 1.
Figure 6 is a partial section on the line 6—6 of Figure 5.
Figure 5:
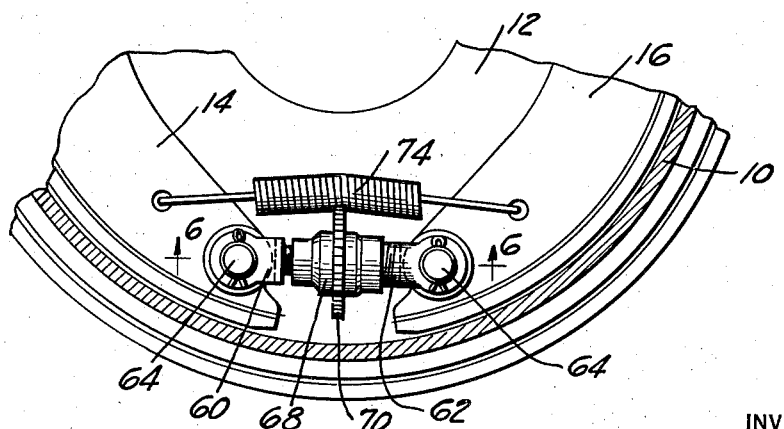
Figure 5 is a partial section, corresponding to the lower portion of Figure 1, but showing the invention adapted to a brake of the servo type.

Figures 5 and 6 illustrate how the shoes 14 and 16 may be connected so that in both directions of rotation of the drum one shoe will act on the other with a servo action, the anchorage being in this case on the flange 30 or other fixed part provided at the top of the brake. In this case the shoes are preferably connected by a rigid floating adjustable link including parts 60 and 62 connected to the ends of the shoe webs by pivots 64.

The parts 60 and 62 are externally provided with oppositely directed threads, and in order to make the adjusting device more compact one part is formed with a socket into which the end of the other part may project when the brake lining is new, and before any adjustment has taken place. An adjusting sleeve 68 has at its ends parts provided with oppositely-directed threads and of different diameters, and which parts are threaded respectively on the members 60 and 62. Sleeve 68 has a projecting toothed sleeve 70, engageable through an opening 72 in the backing plate with a suitable adjusting tool, and yieldingly locked in adjusted position by engagement with a spring 74 tensioned between the shoes.

While an illustrative construction has been described in detail, it is not my intention to limit the scope of the invention to that particular construction, or otherwise than by the terms of the appended claims.

I claim:

1. A brake comprising a drum having a support at its open side, friction means within the drum having adjacent separable ends each carrying a pivot having inner and outer rollers mounted thereon, wedges movable in opposite directions perpendicular to said support and one of which engages the two inner rollers and the other of which engages the two outer rollers, a tension member passing through the support and connected to the wedge which moves toward the support in applying the brake, and a thrust member passing through the support and acting on the wedge which moves away from the support in applying the brake.

2. A brake comprising a drum having a support at its open side, friction means within the drum having adjacent separable ends each carrying a pivot having inner and outer rollers mounted thereon, a bracket mounted on the support and having means guidingly engaging said ends, wedges movable in opposite directions perpendicular to said support and one of which engages the two inner rollers and the other of which engages the two outer rollers, a tension member passing through the support and connected to the wedge which moves toward the support in applying the brake, and a thrust member passing through the support and acting on the wedge which moves away from the support in applying the brake.

3. A brake comprising a drum having a support at its open side, friction means within the drum having adjacent separable ends each carrying a pivot having inner and outer rollers mounted thereon, wedges movable in opposite directions perpendicular to said support and one of which engages the two inner rollers and the other of which engages the two outer rollers, a tension member passing through the support and connected to the wedge which moves toward the support in applying the brake, a thrust member passing through the support and acting on the wedge which moves away from the support in applying the brake, a cup-shaped operating cylinder mounted on the support with said thrust member extending into its open end, and a piston in said cylinder engaging the thrust member.

RUDOLPH A. GOEPFRICH.